United States Patent [19]

Freudenstein et al.

[11] Patent Number: 4,917,066
[45] Date of Patent: Apr. 17, 1990

[54] SWING BEAM INTERNAL-COMBUSTION ENGINES

[75] Inventors: Ferdinand Freudenstein, Bronx, N.Y.; Wayne J. Sohn, Teaneck, N.J.

[73] Assignee: The Trustees of Columbia University in the City of New York, New York, N.Y.

[21] Appl. No.: 301,313

[22] Filed: Jan. 24, 1989

Related U.S. Application Data

[63] Continuation-in-part of Ser. No. 870,507, Jun. 4, 1986, abandoned.

[51] Int. Cl.⁴ ............................................. F02B 75/04
[52] U.S. Cl. ............................... 123/48 B; 123/78 E; 123/197 AC
[58] Field of Search ................. 123/197 AC, 197 AB, 123/54 R, 48 R, 78 R, 78 E, 54 B, 197 R, 48 B

[56] References Cited

U.S. PATENT DOCUMENTS

| | | | |
|---|---|---|---|
| 640,710 | 1/1900 | Secor . | |
| 681,704 | 9/1901 | Jamieson . | |
| 796,680 | 8/1905 | Soller et al. | 123/51 BB |
| 926,564 | 6/1909 | Hollopeter . | |
| 1,189,312 | 7/1916 | Tibbels | 123/197 AC |
| 1,874,194 | 8/1932 | King | 123/197 AC |
| 2,822,791 | 2/1958 | Biermann | 123/197 AC |
| 3,021,825 | 2/1962 | Para | 123/197 AC |
| 4,301,776 | 11/1981 | Fleming | 123/197 AC |
| 4,475,495 | 10/1984 | Lydell | 123/197 AB |
| 4,538,557 | 9/1985 | Kleinek et al. | 123/197 AC |

OTHER PUBLICATIONS

Article entitled "Balancing of Internal-Combustion Engines", by H. F. Fullagar, pp. 559-580, Jul. 1914.
Article entitled "Quite Swing-Beam Diesel has Variable Compression Ratio", by D. Scott, pp. 10-12; Apr. 1977.
Article entitled "The Swing-Beam Engine Concept" by D. W. Tryhorn, pp. 65-67; Feb. 1979.

*Primary Examiner*—David A. Okonsky
*Attorney, Agent, or Firm*—Brumbaugh, Graves, Donohue & Raymond

[57] ABSTRACT

Novel internal-combustion engines of the swing beam type incorporate an improved construction utilizing a Rapson slide motion and also are derived from two or three degree of freedom mechanisms for controlling the displacement of the piston as a function of crankshaft displacement and of the displacement of a control shaft. The control shaft either operates at an average speed which is preferably a prescribed ratio of crank speed, thereby yielding an improved thermodynamic cycle (such as the Atkinson cycle in the case of a four-stroke engine) and cycle timing, or functions as a lever for obtaining variable stroke operation. The mechanism can also incorporate a continuously rotating control shaft together with a second control shaft functioning as a lever, thereby yielding an improved thermodynamic cyle and cycle timing together with variable stroke operation. The control shaft, functioning as a lever, can be replaced by a similar actuating device. The mechanism can also incorporate a variable compression ratio feature.

12 Claims, 5 Drawing Sheets

PROPORTIONS: $(E+R+L)^2 = 8EL$

| CONTROL SHAFT POSITION | CRANK PIN POSITION | PISTON POSITION | STROKE | STROKE LENGTH |
|---|---|---|---|---|
| $P_1$ | $C_3$ | $L_{max}$ | | |
| | | ↓ | EXHAUST | MAXIMUM |
| $P_2$ | $C_1$ | $R_{nom}$ | | |
| | | ↓ | INTAKE | MINIMUM |
| $P_3$ | $C_3$ | $L_{min}$ | | |
| | | ↓ | COMPRESSION | MINIMUM |
| $P_4$ | $C_1$ | $R_{nom}$ | | |
| | | ↓ | POWER | MAXIMUM |
| $P_1$ | $C_3$ | $L_{max}$ | | |

| POS. | STROKE A'–A | CLEARANCE C |
|---|---|---|
| $M_1$ | 3.6 | 0.45 |
| $M_2$ | 2.9 | 0.36 |
| $M_3$ | 2.5 | 0.31 | r = 1.8 (CRANK RADIUS)
R = 5.4 (CONN. ROD LENGTH)

SWING BEAM LENGTH
 (A–B) = 14.38

P = 13.92 (DISTANCE FROM CENTER LINE OF PISTON TO AXIS OF CRANKSHAFT)

NOMINAL COMPRESSION RATIO
 C/R = 9

SWING BEAM INTERNAL-COMBUSTION ENGINES

CROSS-REFERENCE TO RELATED APPLICATION

The present application is a continuation-in-part of U.S. application Ser. No. 870,507, filed June 4, 1986, now abandoned.

FIELD OF THE INVENTION

This invention relates to internal-combustion engine mechanisms for yielding improved fuel economy.

BACKGROUND OF THE INVENTION

Conventional internal-combustion engines, both Otto and Diesel, rely principally on the in-line slider-crank mechanism. In this type of engine, a connecting rod couples each piston directly to a common crankshaft. Another basic type of engine configuration, that has been used in some diesel engines, is known as a swing beam engine. Swing beam engines date back to the turn of the century, and are shown schematically in FIGS. 1 and 2, labelled "Prior Art".

Figure 1:
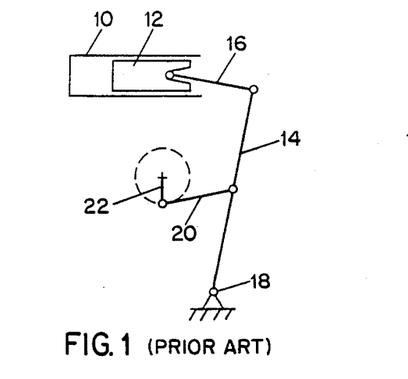
FIGS. 1 and 2 are schematic drawings of prior art swing beam engines, illustrating a single piston and an opposed piston arrangement, respectively.

Referring to FIG. 1, a known swing beam internal-combustion engine includes a cylinder 10 and piston 12, with a swing beam 14 pin-connected to the piston 12 by a connecting link 16. The swing beam 14 is fixedly pivoted, at its opposite end, at pivot point 18. Finally, a connecting rod 20 pivotally connects the swing beam 14 and a crankshaft 22. The crankshaft 22, connecting rod 20, swing beam 14, and fixed pivot 18 constitute a four-bar rocker linkage of which the swing beam is the rocker.

Figure 2:
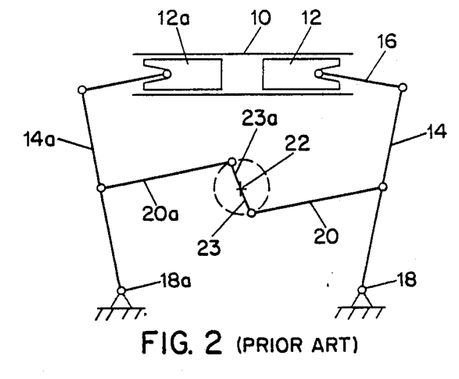

Normally, two mirror-image swing beam configurations are connected back-to-back, as shown in FIG. 2, resulting in opposed pistons sharing a common cylinder. In FIG. 2, mirror image components are numbered with the designation "a". The crankshaft 22, containing crank arms 23 and 23a, actuates both halves of the mechanism. The balance of forces in this arrangement is favorable, except for the rotational inertia of the connecting rods 20, 20a, and some asymmetry in the motion of the connecting rods, which is imparted to the swing beams and pistons. Combustion takes place internally, in the space between the pistons 12 and 12a.

A number of variations of the basic arrangement shown in FIG. 2 have been proposed. For example, in an article entitled "Quiet Swing Beam Has Variable Compression Ratio", D. Scott, *Automotive Enqineering*, April 1977, pages 10-12, the author proposes mounting the lower ends of two swing beams, in a two stroke swing beam diesel engine, in eccentric bearing shafts. According to this proposal, a spring tensioned, toothed belt is arranged between pulleys on the two eccentric shafts and, when the engine is running, the torque pressure of the beams against the eccentrics moves the belt slightly against its retaining spring, thus shifting the fulcrums to reduce piston travel. This permits starting a diesel engine at a 20:1 compression ratio. When the engine is running, the compression ratio is lowered to about 13:1.

In the Scott engine, top dead center of the pistons occurs at bottom dead center of the crank. Because of this, crankpin motion is subtracted from the straightening movement of the connecting rod during the first part of the power stroke. This has the effect of slowing piston movement at the beginning of the power stroke (although the overall duration of the power stroke is the same as in conventional slider-crank engines), which improves combustion. The Scott article also suggests that an eccentric coupler can replace the piston connecting rod.

The piston connecting rods (i.e., the rod between the piston and swing beam) in a swing beam engine can be much shorter than the piston connecting rods in a conventional slider-crank engine, while maintaining the same angular swing of the connecting rod relative to the central piston axis. Possibly, the rods could even be replaced by eccentrics as suggested by Scott. However, it would be even more desirable to provide a swing beam engine configuration having a more compact design that does not require a connecting rod or eccentric between the piston and swing beam. It would also be desirable to provide a swing beam engine in which the piston displacement can be controlled during the engine cycle to produce an improved thermodynamic cycle, for example a longer power stroke relative to the compression stroke (as in Atkinson cycle operation), variable cycle operation and cycle timing, variable stroke and variable compression ratio.

Other internal-combustion engines have been proposed in an attempt to improve the performance of conventional slider-crank engines. These include the offset slider-crank engine, planetary drives and other engines based on standard, single degree of freedom mechanisms, the proportions of which have been altered to improve engine efficiency. In all such engines of which we are aware, the original engine construction or motion, which is symmetrical, is skewed (i.e., rendered unsymmetric) in order to produce the varied engine operating characteristic. By doing so, however, the resulting unsymmetrical mechanism possesses such unfavorable dynamic unbalance and force-transmission characteristics that the engine is impractical.

SUMMARY OF THE INVENTION

The present invention is directed to internal-combustion engine mechanisms with improved structure and with means for varying the stroke and the cycle timing for improved operating efficiency. The present invention has the inherent flexibility for varying the operating characteristics of an internal-combustion engine to a degree not heretofore possible, for yielding improved fuel economy. Moreover, unlike prior art proposals, the engine operating characteristics may be modified to achieve improved engine performance without any significant diminution of the dynamic operating characteristics of the engine. In addition, engines according to the present invention are compact in size.

In accordance with one aspect of the invention, an internal-combustion engine has a novel swing beam mechanism utilizing a Rapson slide motion. In accordance with another aspect of the invention, a novel internal-combustion engine is based on two-degree-of-freedom mechanisms in which the piston displacements during the engine stroke are a function of the displacements of both the crankshaft and a separate control element. The latter may comprise a control shaft that functions as a crank or lever, or other elements. In one type of application, the control shaft operates at an average speed which is a prescribed ratio of crank speed, thereby yielding an improved thermodynamic cycle (such as the Atkinson cycle in the case of a four-stroke engine). The phasing between the control shaft and crankshaft may be modified to vary the timing of piston movement during the cycle. In another type of application, the control shaft functions as a lever for obtaining variable stroke operation. The control element can be designed so that there is a specific functional relationship between the stroke length and the compression ratio.

In accordance with another aspect of the invention, a novel internal-combustion engine is based on three degree of freedom mechanisms in which the piston displacements during the engine stroke are a function of the displacements of both the crankshaft and a separate control element. The latter may comprise a control shaft that functions as a crank in addition to a crank or equivalent element that functions as a lever. This two-degreeof-freedom control element yields an improved thermodynamic cycle and cycle timing together with the capability to vary the average stroke length during operation.

In accordance with a first aspect of the invention, an internal-combustion engine includes a cylinder, a piston slideable in the cylinder, a swing beam having opposite ends, and means pin connecting one end of the swing beam to the piston (i.e. without the intervention of a connecting rod). A swinging block, pivotable about a fixed point, slidingly engages the swing beam so that the swing beam rotates and slides relative to the fixed point. The swing beam, swinging block, cylinder and piston form a type of Rapson slide mechanism. A connecting rod is pivotably connected at one end to the crankshaft and at its other end either to the swing beam or to the swinging block of the Rapson slide mechanism.

In one embodiment, the swing beam has a guide portion that slidingly receives a swinging block. The swinging block is fixed on a pivot. As the piston moves back and forth in the cylinder, the swing beam slides and rotates around the fixed pivot. The lower end of the swing beam is connected by a connecting link to the crankshaft, and moves in an arc. The mechanism can be proportioned so that the lower end describes a close approximation of a circular arc, and a rocker link may be pin connected to the lower end for added strength. In this case, a small eccentric is used to connect the upper swing beam to the piston.

In a modified arrangement, the swing beam also slides within a swinging Rapson guide block that pivots about a fixed point. However, the connecting link from the crankshaft is pin connected to the swinging guide block rather than to the swing beam. In this arrangement, rotational movement of the guide block, which is caused by movement of the piston, is imparted to the crankshaft through the connecting link. Such mechanism provides a very compact design.

In accordance with another aspect of the invention, an internal-combustion engine comprises a cylinder and a piston slideable in the cylinder, and a swing beam having opposite ends connected, either directly or by an intervening connecting link, to the piston. A crankshaft is also connected to the swing beam, either directly or through the intervention of another connecting link, and the swing beam slides and rotates around a pivot point. The movement of the piston is a function of the displacement of the crankshaft and also the displacement of a control means whose output is connected to the pivot point of the swing beam for moving the pivot point in a controlled manner. The stroke length and the timing of the piston movement may be controlled and varied in a desired manner.

In one type of application, a control shaft is designed to rotate continuously. In one embodiment, the piston is connected, by a connecting link, to the swing beam. The other end of the swing beam is connected to a rotating control shaft, and the crankshaft is connected, by a connecting link, to the swing beam between its ends. In four-stroke engines the control shaft rotates preferably at an odd multiple of half crankshaft speed, for example at half crankshaft speed, and varies the piston stroke so that the length of the piston travel is greater during power stroke than during the compression stroke as in an Atkinson cycle operation, and also improves timing.

In a modified embodiment, the swing beam is directly pin connected to the piston, without the intervention of a connecting rod. In this case, however, both the crankshaft and the control shaft are connected to the swing beam by way of connecting links.

In several embodiments of the invention, a swinging block, coupled to the control shaft, slidingly engages the swing beam, to form a Rapson slide mechanism; but, the pivot for the swinging block is coupled to the control shaft rather than being fixed. In one embodiment, the swing beam is pin connected to the piston and connected through a connecting rod to the crankshaft. In another embodiment, the swing beam is connected through a connecting link to the piston, and pin connected to the crankshaft.

The control shaft may be designed to rotate continuously to produce an Atkinson cycle. In another type of application, however, the control shaft may be designed to act as a lever to modify the length of the piston stroke.

In another form of the invention in which the swing beam slides and rotates about the pivot axis of a swinging block, the pivot point of the swinging block is moveable in a controlled, preferably linear, manner by a control shaft. The control shaft may be designed to rotate continuously to produce an Atkinson cycle. In another type of application, the control shaft may be designed to act as a lever, to modify the length of the piston stroke. The mechanism may be proportioned so that the pivot may be moved along a fixed, linear guideway in such a manner that the piston stroke can be varied essentially without changing the compression ratio or top dead center timing. Alternately, a guideway may move the pivot linearly along a predetermined angle, or along another selected path, so that the piston stroke can be varied while changing the compression ratio in prescribed fashion.

This latter mechanism may be modified so that the orientation of the linear guideway itself is variable to provide an additional, independent control of the compression ratio of the engine. Alternatively, in place of a linear guideway the movement of the pivot can be controlled by a rocker linkage or other means.

In accordance with another aspect of the invention, an internal-combustion engine comprises a cylinder and a piston slideable in the cylinder, and a swing beam having opposite ends connected either directly or by an intervening connecting link to the piston. A crankshaft is also connected to the swing beam, either directly or through the intervention of another connecting link. A swinging block slidingly engages the swing beam, to form a Rapson slide mechanism, but the pivot for the swinging block is coupled by a two degree of freedom control mechanism rather than being fixed. The pivot point of the swinging block is moveable in a controlled, preferably linear manner by the control mechanism. The control mechanism contains a continuously rotating shaft which provides an oscillating motion to the pivot of the swinging block. The control mechanism also contains a lever or similar actuating device which varies the mean position of the pivot for the swinging block. These two controls combine to produce a mechanism which yields an improved thermodynamic cycle and cycle timing and which also has the ability to change the average piston stroke length. The control mechanism can be proportioned so that the compression ratio and thermodynamic cycle change in a prescribed fashion when the average piston stroke is varied.

In addition, the control mechanism can be proportioned so that, as the average stroke length varies, the thermodynamic cycle and cycle timing vary in a prescribed manner. In one embodiment, the power stroke and compression ratio are designed to remain constant while the average stroke length is varied.

Other variations of the aforementioned embodiments, using Rapson slide mechanisms, may be employed using various combinations of connecting links between the swing beam and piston, the swinging block and control shaft, and the crankshaft and swing beam.

For a better understanding of the invention, reference is made to the following detailed description of the preferred embodiments, taken in conjunction with the drawings accompanying the application.

BRIEF DESCRIPTION OF THE DRAWINGS

FIG. 5b is a drawing showing various piston top dead center and bottom dead center positions in accordance with the embodiment of FIG. 5a;

FIG. 5c is a table showing the various piston positions and movements of the engine shown in FIG. 5a;

FIG. 8a is a schematic drawing of a swing beam engine having Rapson slide elements, and a control means for adjusting the pivot position;

FIGS. 8b and 8c are top and perspective schematic drawings of a slide block mechanism used in FIG. 8a;

FIG. 8d is a schematic drawing of an engine incorporating the linkage of FIG. 8a;

FIG. 8e is a sectional view taken through lines a—a of FIG. 8d;

FIG. 9 is a schematic drawing of the stroke control layout of an engine in accordance with FIG. 8a, for providing a variable stroke operation, at essentially constant compression ratio and top dead center timing;

FIG. 10 is a schematic drawing of a modified guide in a Rapson slide mechanism for use in FIG. 8a;

FIG. 11 is a Rapson slide swing beam engine with a rocker control means;

FIGS. 12a–12c are schematic views of a four-cylinder Rapson slide swing beam engine illustrating the operation thereof;

DETAILED DESCRIPTION OF PREFERRED EMBODIMENTS

Figures 3A, 3B:
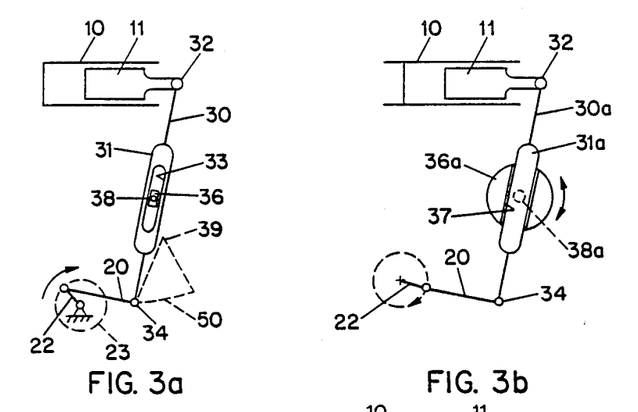
FIGS. 3a, 3b and 3c illustrate three embodiments of a compact swing beam engine using a Rapson slide mechanism.
Figure 3C:
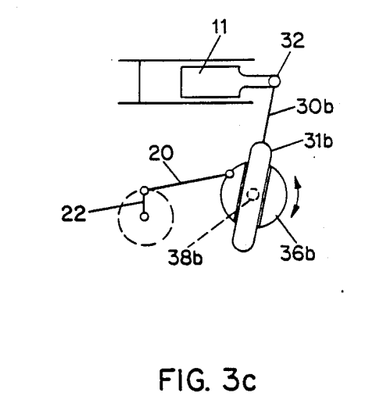

FIGS. 3a–3c illustrate three embodiments of Rapson slide type swing beam engines. For purposes of illustration, these figures and other figures show a single piston engine. However, it would be readily apparent also to construct engines with an opposed piston structure, in the manner illustrated in FIG. 2. Most preferably, the mechanisms described herein are intended to be employed in spark ignited, multiple cylinder engines, one such engine being illustrated by FIGS. 12a–c in connection with another embodiment. Opposed-piston engines, as well as multiple cylinder engines are within the scope of this invention.

The engine shown in FIG. 3a includes a cylinder head 10, a piston 11, a crankshaft 22, a connecting rod 20, and a swing beam 30. The swing beam 30 is pin connected (i.e. directly connected) at one end 32 to the piston 11 and at its other end 34 to the connecting rod 20.

A portion of the swing beam 30 is in the form of a guide 31 having an elongated slot 33 therein. A swinging block 36 which is pivotable around a fixed pivot 38, is disposed in the slot 33 such that the swing beam 30 is free to slide in the longitudinal direction, but must always rotate about fixed pivot 38. As is clear from the amount of rotation capable of being imparted to the swing beam 30, "rotation" as used herein with respect to the swing beam 30 is oscillatory in nature, rather than full rotation. The guide 31 and cooperating block 36 act in conjunction with cylinder 10, piston 11, and swing beam 30, to produce a form of Rapson slide, of the type used in the actuation of rudders in ships. Because the Rapson slide elements 31 and 36 pivotably, but slidingly, support the swing beam 30 between piston 11 and connecting rod 20, there is no need for a connecting rod between the piston and the swing beam.

As used in the specification and claims, the term "Rapson slide elements" refers to the combination of a swinging block, e.g. 36 (or swinging block 36a or 52 or 60 or 70 as described in other embodiments) having a pivot, e.g. 38, and a second element (e.g. 31) that slides and rotates relative to the pivot axis. Such a mechanism, when the second element is a swing beam, produces a Rapson slide type motion in a swing beam engine.

Referring again to FIG. 3a, as the piston 11 slides in cylinder 10, the swing beam 30 slides and rotates about pivot 38, and the guide portion 31 of swing beam 30 slides relative to block 36 to accommodate changes in the distance between pivot 38 and moving end 32. The lower end 34 of the swing beam 30 moves back and forth, as indicated by dashed arcs 50, in conjunction with the crankshaft 22. The rotational movement of the crankshaft 22 is indicated by dashed lines 23.

FIG. 3b is the equivalent of FIG. 3a, except that the guide groove is in the swinging block rather than the swing beam. A swing beam 30a is pin connected at its upper end 32 to piston 11 and at its lower end 34 to connecting rod 20. The swing beam 30a has a portion 31a between the ends 32, 34 formed as a sliding member, which is slidingly received in the groove 37 of a swinging block 36a. The swing beam 30a can slide and rotate about fixed pivot point 38a, since it is free to slide longitudinally relative to the swinging block 36a, and operates in a manner similar to FIG. 3a.

In the modification shown in FIG. 3c, a swing beam 30b is again directly pin connected to the piston 11 and has a slide portion 31b. The portion 31b is received in a swinging block 36b pivotable about fixed pivot 38b. The connecting rod 20 is pin connected to the swinging block 36b, rather than to the swing beam 30b, to produce a laterally and vertically compact configuration.

The swinging blocks 36, 36a and 36b of the various embodiments need to be given proportions sufficient to sustain the various forces imparted. In FIGS. 3a and 3b, the swinging block 36, 36a needs to be able to sustain the linear force exerted on the pivot pin 38a, by virtue of the fact that pivot 38a acts as a fulcrum between opposite ends of a lever, swing beam 30a. In the case of FIG. 3c, the swinging block 36b needs to be able to sustain not just linear force on the pivot 38b, but also torque imparted to the swinging blocks 36b by swing beam 30b in transmitting driving force from the piston to the crankshaft.

Referring again to FIG. 3a, while the swing beam ends 32 and 34 lie on opposite sides of the pivot 38, because of the Rapson slide elements 31, 36 they do not execute the same motion. This is true even if the pivot 38 is symmetrically located between the ends 32, 34. It can be shown from kinematic theory or layout that the trajectory of the pivot point 34, joining connecting rod 20 and swing beam 30, represents an approximate circular arc 50 having a center 39. Hence, crankshaft 22 and connecting rod 20 execute a motion which constitutes a close approximation to the crank and coupler of a crank and rocker linkage, in which the dimension from points 39 to 34 may be regarded as the length of a virtual rocker. By proportioning the crank and rocker linkage so that it is of the non-centric type (that is, the positions of the crank 22, at opposite extremes of the arc 50, are not 180° apart), the forward and return motions of the piston are of unequal time duration. The unequal motion may be used to advantage to lengthen the time duration of the power stroke relative to that of the compression stroke, and hence to improve combustion efficiency.

For example, the linkage may be proportioned, as generally indicated in FIG. 3a, so that the leftmost travel of joint 34 occurs when the crankshaft 22 is near the 270° (9 o'clock) position, but so that joint 34 reaches the right end of arc 50, which corresponds to the compression stroke of piston 11, before the crank arm 22 has reached the 90° (3 o'clock) position, i.e. in less than half a crank revolution. During the opposite direction of piston travel, which corresponds to the power stroke, crank arm 22 would travel more than 180°. Thus, instead of having power and compression strokes of equal time duration, i.e. half a crankshaft revolution each, the power stroke has a longer time duration than the compression stroke. Proportioning of a crank and rocker linkage, to produce a non-centric movement is a matter of known kinematic design. Thereby, by utilizing such principles, the present invention can readily be proportioned to produce the desired cycle timing.

Figure 4:
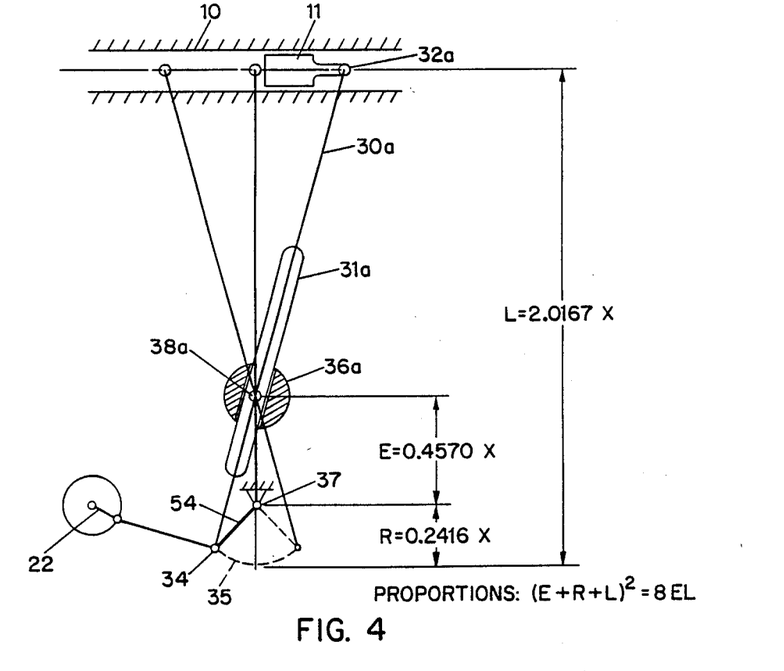
FIG. 4 is a schematic illustration of another compact swing beam engine using a Rapson slide mechanism.

FIG. 4 illustrates another embodiment of a compact swing beam engine using a Rapson slide mechanism, similar to FIG. 3b. In the embodiment of FIG. 4, the Rapson slide portion of the swing beam engine is proportioned so that the trajectory of pivoting joint 34 possesses six symmetrically disposed points on a common circular arc 35, shown in dashed lines. The dimensioning of the Rapson slide to produce this movement may be determined from the theory of minimum error linkage synthesis, which is discussed in the article, "Structural Error Analysis in Plane Kinematic Synthesis", F. Freudenstein, Trans. A.S.M.E. 81B, J. Eng. Ind., 1959, pp. 15–22; and in "Angenaherte Synthese von Mechanismen", S. Sch. Bloch, Verlag Technik, Berlin, 1951, the disclosures of which are incorporated by reference.

As an example, in FIG. 4, the swing beam 30a may have a length of 2.0167 X, where X is a constant, with the pivot point 38a located at a distance 0.6986 X from point 34. With this geometry the pivot point 38a and center 37 of rotation of arc 35 lie on a line perpendicular to the piston axis, such that the distance "E" between points 38a and 37 is 0.4570 X, and the radius "R" of the arc 35 is 0.2416 X. The relative dimensions have the following relationship:

$$(E+R+L)2 = 8EL$$

For practical purposes, therefore, the trajectory of point 34 is almost indistinguishable from this circular arc 35. Accordingly, an extra rocker 54 may be connected to joint 34, the length of which is equal to the radius of curvature of the circular arc generated by point 34. The ability to use a rocker 54 provides an exceptionally sturdy construction.

If a rocker 54 is added, it may be necessary to connect the upper end of the swing beam 30a to the piston 11 by means of a small eccentric, indicated by 32a. This is true because where the upper end of swing beam 30a is pin connected to the piston, and therefore moves exactly in a straight line parallel to the piston axis (as in FIGS. 3a–3c), the arc 35 described by joint 34 is not perfectly circular. Therefore, if joint 34 is connected to a rocker 54, and thus forced to follow an exact circular arc, it follows that the upper end 32a of the swing beam 30a cannot move exactly in a straight line. With an optimal linkage design, as described above, the deviation of point 32a from straight line movement is minimal, on the order of 1/32" or less. If the engine tolerances are not sufficient to take up this movement, the deviation can be taken up by a small eccentric, as indicated by 32a. Eccentric bearings of a suitable type are known.

In all of the aforementioned embodiments, the amount of sliding between the swing beam and the swinging block is relatively small. In the case of an engine having a 90 mm stroke and a maximum swing beam angularity (relative to the mean position of the swing beam) of 15°, the maximum sliding can be calculated as:

$$(\tfrac{1}{2})(90)(1-\cos 15°) = 1.53 \text{ mm, or } 1.7\% \text{ of stroke.}$$

For practical purposes, the corresponding energy loss is negligible.

FIGS. 5–14 illustrate internal-combustion engines based on multiple-degree-of-freedom mechanisms for optimizing the thermodynamic cycle and the timing of piston movement during the cycle and/or varying the average stroke length. The piston displacements in these mechanisms are functions of two displacements: the displacement of the crankshaft and the displacement of a second element, which will be referred to as a control shaft. In FIGS. 10, 13a–b, and 14, the position of the piston is dependent also upon a third input, and thus the engine itself is based on a three degree-of-freedom mechanism. As discussed below, the control shaft may act through a group of elements. In these embodiments, one-degree-of-freedom corresponds to the rotation of the crankshaft, while the second is effected through the control means.

Figure 5A:
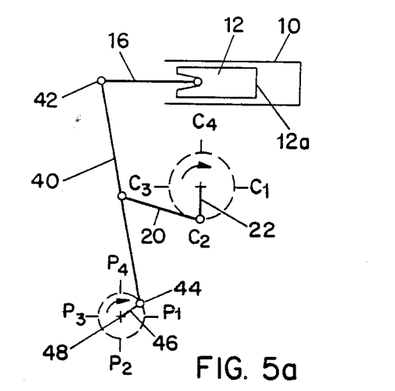
FIG. 5a is a schematic drawing of a swing beam engine having a control means based on a two-degree-of-freedom mechanism for obtaining Atkinson cycle operation.
Figure 5B:
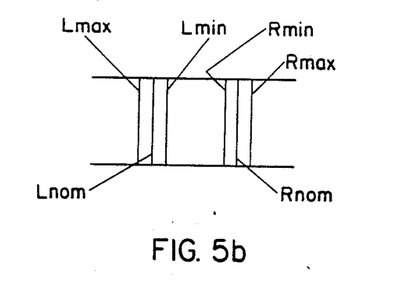
Figure 5C:
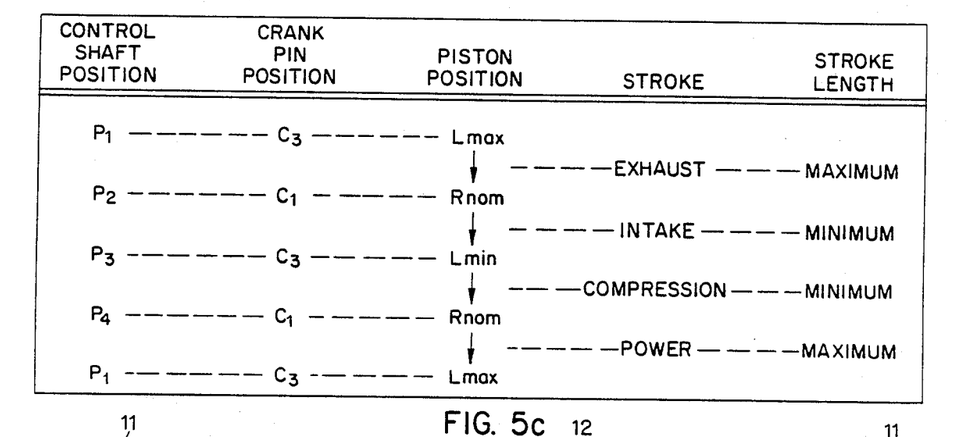

One known thermodynamic cycle for operating a four-cycle internal-combustion engine is the Atkinson cycle. A basic characteristic of the Atkinson cycle is an expansion stroke which is longer than the compression stroke. In this way, more of the energy of combustion is converted into useful work. FIGS. 5a–5c illustrate a first embodiment of an engine having a control shaft for operating on an Atkinson cycle.

In FIG. 5a, a single cylinder swing-beam engine has a cylinder 10, a piston 12, and a piston connecting rod 16 that may be similar to the piston and connecting rod in FIG. 1. A swing-beam 40 is pin connected at one end 42 to the connecting rod 16, and at its other end 44 is pin connected to a control shaft 46 rotatable about axis 48. The connecting rod 20 is pin connected to the swing-beam 40 and also to the crankshaft 22. Four rotational positions of the control shaft 46, spaced 90° apart, are indicated by P1, P2, P3 and P4. Four 90° positions of rotation of the crankshaft 22 are indicated by C1 C2, C3, and C4.

The instantaneous position of the piston 12 depends both on the position of crankshaft 22 and on the position of control shaft 46. FIG. 5b illustrates possible positions that the forward face 12a of the piston 12 may have as follows: (i) Lmax, Rmax, where the rotational positions of shafts 22, 46 are angularly 180° out of phase, such that the effect on piston displacement is additive; (ii) Lmin, Rmin, where the rotational positions of the shafts 22, 46 are angularly in phase such that the crankshaft and control shaft partially cancel each other out; or (iii) Lnom, Rnom, where the shafts 22, 46 are 90° out of phase. The three positions indicated by R are the possible positions at top dead center of the cycle, whereas the positions indicated by L are possible positions at bottom dead center of the cycle.

For example, if crankshaft 22 is at position C1 and control shaft 46 is at position P3 (180° out of phase), the forward face 12a of the piston 12 would be at position Rmax. If crankshaft 22 is at position C3, and control shaft 46 is at position P1, the forward face of piston 12 would be at position Lmax. In contrast, if crankshaft 22 is at position C3, and control shaft 46 is at position P3 (in phase), the forward face of piston 12 would be at position Lmin, rather than Lmax. The shafts 22, 46 can be operated such that, at top dead center and bottom dead center, the phasing of shafts 22, 46 is not a multiple of 90°.

For the operation of FIG. 5a in a four stroke engine, drive means (not shown) are provided to rotate the control shaft at plus or minus ½ the speed of the crankshaft (i.e. at camshaft speed). The control shaft is preferably directly geared to the crankshaft. Mechanisms for doing so are well within the skill of the art. However, theoretically the control shaft may be independently actuated by a separate drive.

FIG. 5c is a table indicating the operation of the FIG. 5a device in the case where the control shaft 46 operates at one-half the speed of the crankshaft 22. As shown, in the time it takes control shaft 46 to execute one revolution, the crankshaft 22 executes two revolutions. The length of any stroke, as shown in FIG. 5c, corresponds to the distance between L and R positions at the beginning and end of the stroke. In this illustrative example, the piston travels from Lmax to Rnom during the exhaust stroke, between Rnom and Lmin during the intake and compression strokes, and from Rnom to Lmax during the power stroke. From the viewpoint of energy, the most significant stroke is the power stroke, and as shown in FIG. 5c, the length of the power stroke is longer than the intake and compression strokes, as in Atkinson cycle operation.

As noted above, the phasing between the crankshaft 22 and control shaft 46 can be varied to modify the cycle stroke and timing. For example, the shafts 22, 46 in the engine shown in FIG. 5a may be slightly out of phase so as to provide more time at the beginning of the power stroke than in the conventional slider crank mechanism. Also, the shafts 22, 46 may be rotated in opposite directions.

The control means according to the invention can be used to alter the character of the thermodynamic cycle in at least two ways: by changing the lengths of the stroke, for example as illustrated in connection with FIGS. 5a–5c where the control shaft operates at a fraction of crankshaft speed, and by changing the cycle event timing, which can be effected by changing the phasing between the crankshaft and control shaft rotation and also by the dimensions selected for the control means and its position relative to the rest of the engine. In the case of a four stroke cycle, typical values of the ratio V (ratio of average speed of control shaft to that of crankshaft) are $V = \pm((n-1)/2)$, where n is a positive integer. In the case of a two stroke cycle, the ability to adjust the character of the thermodynamic cycle is less than in the case of a four stroke cycle. If a speed ratio of one half were used, for example, the ratio of the length of the power and compression strokes could exceed unity only every second cycle. However, the ability to control cycle timing by adjusting the phasing between crankshaft and control means exists also in two cycle engines.

In order to obtain the most favorable force transmission in swing beam engines, it is desirable to restrict the angular swing of the swing beam, just as the angularity of the connecting rod in ordinary slider-crank engines is restricted. In swing beam engines, the angular swing of the swing beam should preferably be maintained within about 15° from the direction perpendicular to piston displacement. This applies both to conventional swing beam engines with a control shaft according to this invention as well as to the Rapson slide type of swing beam engine.

When a continuously rotating control shaft, e.g. 46, is added to a swing beam engine, some of the power is transmitted to the crankshaft through the control shaft 46. The latter, therefore, needs to be proportioned accordingly. When the control shaft functions as a control lever, however (as in variable stroke operation, e.g.), no power will be transmitted by the control lever to the crankshaft.

The control shaft, however, need not be joint connected directly to the swing-beam. As will be evident in connection with the embodiments shown in FIGS.

8-11, the connection between control shaft and swing beam may comprise a connecting link assembly such that the combination of control shaft, connecting link assembly, swing-beam and fixed link constitute a slider crank motion, or a crank and rocker motion, or other motion.

Many variations of the construction of the control means shown in FIG. 5a fall within the scope of the invention, some of which are described further on, and can be derived from two-degree-of-freedom mechanisms. For example, the control shaft may be in the form of a crank or eccentric connected to a connecting rod and slider, the wrist pin of which is attached to the control pin, as described in connection with FIGS. 8 and 9. A crank and rocker control means is described in connection with the embodiment shown in FIG. 11.

Figure 6:
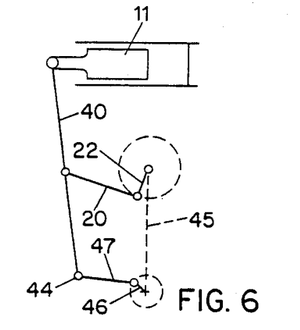
FIG. 6 is a schematic drawing of a modified swing beam engine with a control means.

FIG. 6 shows a swing-beam engine which is similar to that shown in FIG. 5a, except that the swing beam 40 is directly pin connected to the piston 11. In this case, the opposite end 44 of the swing beam 40 is connected to the control shaft 46 by a connecting rod 47, rather than being directly connected to the control shaft 46 as in FIG. 5a. FIG. 6 also indicates schematically a gear connection 45 between the crankshaft 22 and control shaft 46 for actuating the latter.

It should be noted that, in all of these embodiments, the relative positions of the crankshaft and control shaft may be reversed. Also, the control shaft may be located either on the same side of the swing beam as the crankshaft or on opposite sides. Further, where the crankshaft and control shaft are both on one side of the swing beam, they may be on the same side of the swing beam as the piston, or on the opposite side.

Figure 7A:
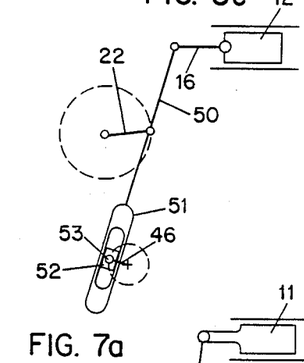
FIGS. 7a–7d are schematic drawings of other embodiments of swing beam engines having a control means.

FIGS. 7a-7d show another form of a swing beam engine namely, a Rapson slide-type engine of the type disclosed in FIGS. 3a-3c, but based on a two degree-of-freedom mechanism, including a control shaft, for yielding Atkinson cycle operation. In FIG. 7a, a swing beam 50 includes a Rapson guide portion 51 at its lower end, which has an elongated guide slot therein to receive a pivotable sliding block 52. The guide portion 51 and swinging block 52 correspond to elements 31 and 36, respectively, in FIG. 3a. The pivot pin 53 of the block 52 is also connected to the rotating control shaft 46.

Figure 7B:
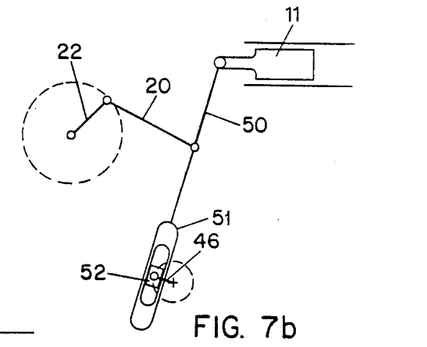
Figure 7C:
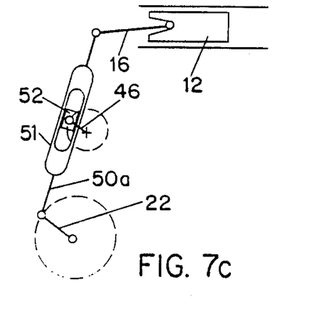
Figure 7D:
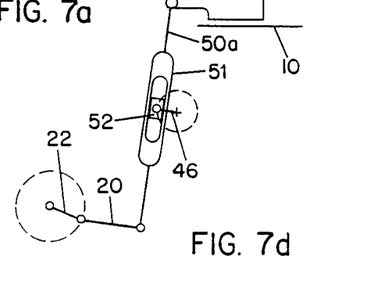

FIGS. 7b and 7c illustrate two embodiments of swing beams 50 and 50a which are connected directly, or by a link 16, to a piston 11, 12. Each includes Rapson slide elements 51, 52 directly pin connected to the control shaft 46. In the case of FIG. 7b, where the swing beam 50 is directly pin connected to the piston 11, the crankshaft 22 is connected to the swing beam 50 through an intermediate link 20 in order to maintain a coordinated movement. In FIG. 7c, an intermediate link 20 is not used. FIG. 7d is similar to FIG. 7b, except that the positions of the control shaft 46 and crankshaft 22 have been reversed.

It should be noted that regardless of whether the engine includes a control shaft geared to the crankshaft, or whether the control shaft functions as a lever, the positions of which corresponds to a desired stroke, the only power loss associated with the control shaft or lever is that required to overcome frictional losses.

The embodiments illustrated in FIGS. 7a-7d may operate in a manner similar to FIG. 5a. Drive means (not shown) are coupled to the control shaft 46 to rotate the control shaft 46 at predetermined speed, preferably at a fraction of crankshaft speed for producing Atkinson cycle operation. The phasing between control shaft 46 and crankshaft 22 may be as described in connection with FIG. 5c, or may be varied to change the cycle event timing.

Embodiments of this invention can also be used for variable stroke operation. In this case, the control shaft functions as a control lever. It is possible to employ the embodiments of FIGS. 3-6 and 7a-d for this type of operation, by using a suitable controlled drive for the control shaft. But, for variable stroke operation, embodiments incorporating the additional features disclosed in connection with FIGS. 8-11 are preferred.

Figures 8A, 8B, 8C, 8D, 8E, 10, 11, 12A, 12B:
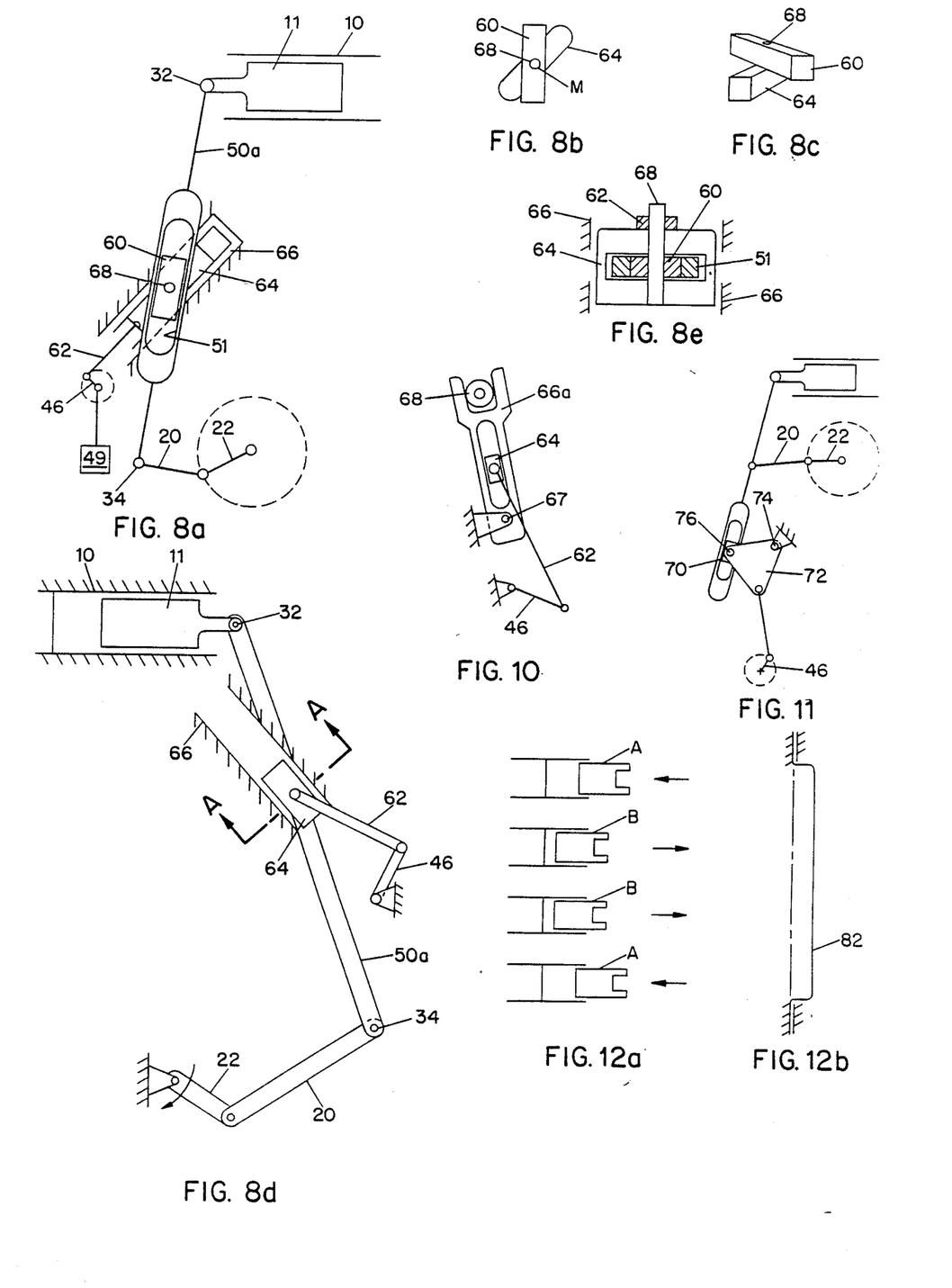

FIG. 8a shows schematically a Rapson slide type of swing beam engine in which the position of the control shaft 46 determines the position of a swinging block 60 by means of a slider-crank mechanism. The control shaft 46 is connected by a control rod 62 to a sliding block 64, which can move longitudinally in fixed slideway 66. As shown in FIGS. 8b and 8c, sliding block 64 is connected, by pivot pin 68, to an upper swinging block 60.

The swing beam 50a includes a Rapson guide portion 51 similar to the constructions shown in FIGS. 3a, 7c, and 7d. The guide 51 slidingly engages the upper swinging block 60.

Pivot pin 68 thus also forms the pivot point for the swinging block 60. With the pivot pin 68 stationary, the engine operates as described in connection with FIG. 3a. However, because the pivot pin 68 can be displaced along slideway 66, this construction provides several additional modes of operation.

The construction shown in FIG. 8a is merely schematic. It will be apparent to persons skilled in the art that, in view of the forces transmitted through the mechanisms, the actual construction of FIG. 8a may take a variety of forms. FIGS. 8d and 8e show one such example, in which like elements have been given numbers corresponding to the components of FIG. 8a.

Figures 9, 12C:
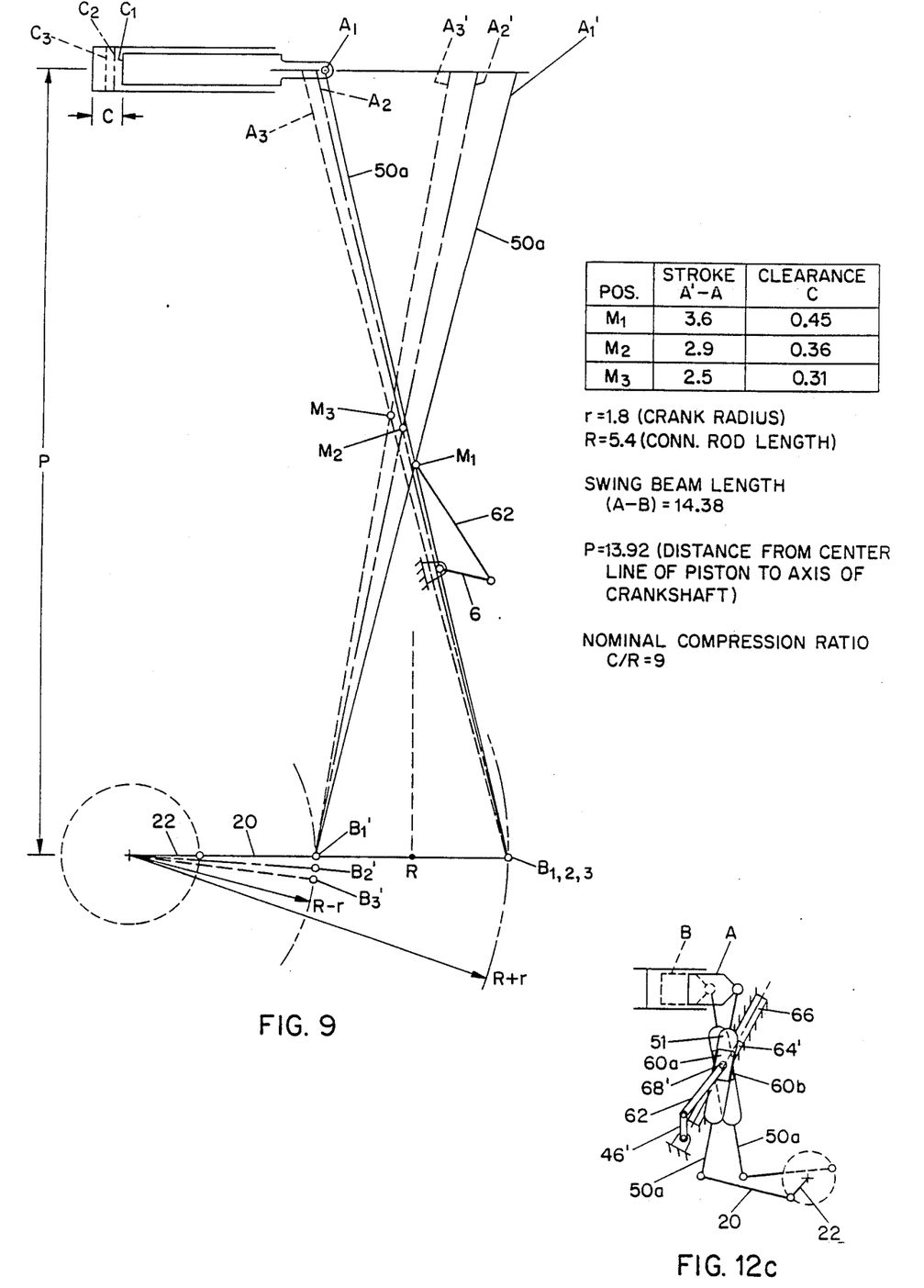

In one control mode, the control shaft 46 acts as a control lever, the position of which regulates piston stroke. FIG. 9 illustrates a preferred kinematic layout for effecting this arrangement, showing several positions ($M_1$, $M_2$, $M_3$) of the center M of the swinging block 60. The illustrated geometry provides a stroke variation of up to approximately 30% of maximum at a constant compression ratio (9:1 in the layout).

FIG. 9 illustrates that, by kinematic synthesis or layout, appropriate dimensions may be determined that will (a) provide a variable stroke capability; (b) maintain a nearly constant compression ratio; and (c) maintain essentially a constant top dead center timing. As can be seen in FIG. 9, the points $M_1$, $M_2$ and $M_3$ are nearly collinear, but they are not aligned with axis $A_1$-$B_1$. Therefore, the position of the piston, at top dead center of the stroke, varies from positions $C_1$ to $C_2$ to $C_3$ as shown in the layout in FIG. 9 (the piston position is indicated by "C", the piston clearance at top dead center). The length of piston stroke differs for each position $M_1$, $M_2$, $M_3$, but because the top dead center position varies in the same proportion, the final compression ratio remains essentially the same.

Illustrative dimensions of the various links are shown in FIG. 9, where "r" is the radius of the crankshaft 22, "R" is the length of the connecting rod 20, and A–B is the length of the swing beam 50a. $A_1$, $B_1$, and $A_1$, $B_1$ represent the positions of the ends 32, 34 of the swing beam 50a at top dead center and bottom dead center for pin position $M_1$. $A_2$, $B_2$ and $A'_2$, $B'_2$, and the broken line, indicate the corresponding end positions, and swing beam position, respectively, for pin position $M_2$. $A_3$, $B_3$ and $A'_3$, $B'_3$, and the dashed line, indicate the positions at $M_3$. Points $C_1$, $C_2$, and $C_3$ indicate the piston top dead center positions for pin positions $M_1$, $M_2$, and $M_3$, respectively. Finally, "P" is the distance between the piston axis and the crankshaft axis.

As can be seen from FIG. 9, points $M_1$, $M_2$ $M_3$ are nearly collinear, so that the slider crank guidance shown in FIG. 8a is feasible. In addition, the timing of the top dead center position (determined by points $B_1$, $B_2$, and $B_3$ of the layout) remains essentially unchanged. Hence, stroke variation can be obtained at nearly constant compression ratio and essentially without disturbing valve timing at or near top dead center. Alternately, the line on which points $M_1$, $M_2$ and $M_3$ lie can be chosen so that the compression ratio changes in a desired manner with stroke length.

In another mode of operation, in the case of a four stroke engine, the control shaft 46 is driven typically at an odd multiple of half crankshaft speed. With appropriate phasing of the control shaft and crankshaft, such that the power stroke is made longer than the compression stroke, this will produce an Atkinson cycle. The phasing of the control shaft relative to the crankshaft, to maintain normal cycle timing, should be such that the top dead center position corresponds to the position in which the swinging block is at its upper extreme position.

In order to obtain the foregoing modes of operation, suitable controls and means for engaging and disengaging the control shaft can be employed. For example, in the case of the first mode of embodiment, a microprocessor-controlled actuation 49 (see FIG. 8a) of control lever 46 can be employed. In the latter mode, the control shaft preferably is positively connected to the crank. A phase changer can also be employed in order to adjust or maintain correct valve timing and/or to vary the Atkinson cycle timing within reasonable limits.

FIG. 10 illustrates a mechanism for providing another mode of operation of the configuration shown in FIG. 8a. In this embodiment, rather than providing the fixed guide 66 of FIG. 8a, a guide 66a is held between a fixed pivot 67 and an eccentric 68. For clarity, only the bottom member 64 of the sliding block assembly 64, 68 is illustrated. Guide 66a can be oriented in the manner shown in FIG. 9, whereby at the center position of the eccentric 68 the control member 46 moves block 64 so as to change stroke length without changing compression ratio. The angular orientation of the guide 66a, however, which governs the path of the auxiliary slider 64, is adjustable by the eccentric 68, which will thereby increase or lower the compression ratio. The effect of the timing on the top dead center position may be negligible if the compression ratio variation is limited to a reasonably small percentage of nominal.

Any suitable drive means may be connected to the eccentric for controlled actuation thereof. In engine operation, there exist a number of known engine operating conditions where it is desirable to run at reduced engine compression ratio, or to temporarily reduce compression ratio (e.g. during engine knocking). The drive means may be controlled responsive to any such desired engine operating parameters.

FIG. 11 shows an alternative arrangement in which the guidance of a swinging block 70 takes place below the crankshaft and the control linkage in this case is a crank and rocker. As noted before, the relative positions of these elements are interchangeable. In this case, control shaft 46 is pin connected to a plate 72, fixedly pivoted around pivot point 74. The plate in turn is pin connected at 76 to the swinging block 70. The path of the pin on a swinging block is a circular arc, the orientation and radius of which are adjustable within limits to satisfy design requirements.

Figure 13A:
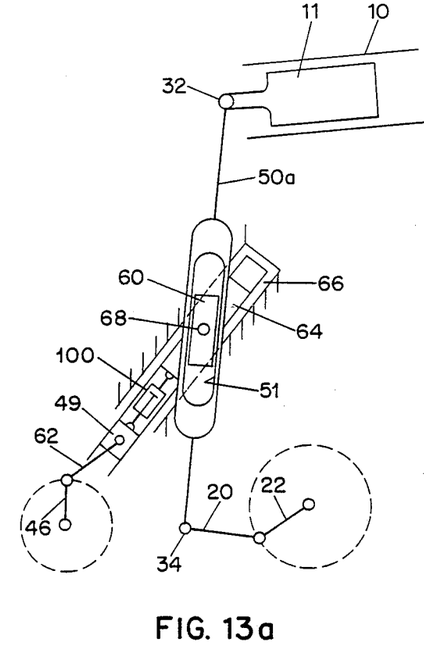
FIG. 13a and 13b are schematic views of two embodiments of a swing beam engine having Rapson slide elements and two degree of freedom controls.
Figure 13B:
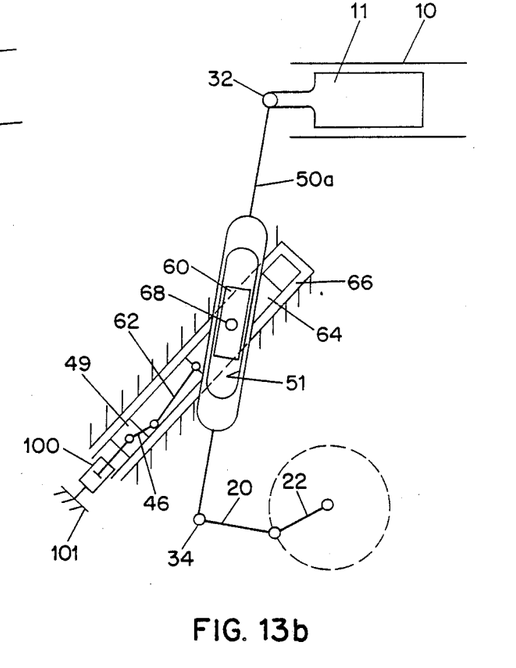

FIGS. 13a and 13b illustrate further modifications for the FIG. 8a engine. As in the case of FIG. 8a, a piston 11 slides in a cylinder 10 and is pin-connected to a swing beam 50a. The opposite end 34 of the swing beam 50a is connected, through connecting rod 20, to the main crankshaft 22. Moreover the swing beam 50a includes a slide portion 51 which is slidingly received in a guide groove of swing block 60. As in the case of FIG. 8a, the swinging block 60 is pivotably connected, about a pivot 68, to a sliding block 64, which in turn is longitudinally displaceable in fixed slideway 66. An actuation device is combined with a continuously rotating control shaft to provide variable stroke operation together with improved thermodynamic cycle and cycle timing.

FIG. 13a shows one embodiment of this three-degree-of-freedom mechanism. The control shaft 46 is connected by a control rod 62 to a sliding block 99 which can move longitudinally in fixed slideway 66. Sliding block 64 and sliding block 99 are coupled by an actuation means 100, which is shown as a hydraulic actuator. The control shaft 46 is driven typically at an odd multiple of half crankshaft speed. With appropriate phasing of the control shaft and crankshaft, such that the power stroke is longer than the compression stroke, an Atkinson cycle will result. Actuating device 100 controls the distance between sliding blocks 64 and 99. By varying this distance, the average position of block 64 varies. The average stroke length is directly related to the average position of block 64.

In the construction shown in FIG. 8a, control shaft 46 can operate in two modes. The shaft can rotate continuously and cause sliding block 64 to oscillate about an average position, thus yielding an Atkinson cycle. Alternatively, the shaft can act as a lever, varying the position of block 64 and consequently varying the stroke length. The construction shown in FIG. 13a combines both these features. A continuously rotating control shaft 46 provides an Atkinson cycle operation while an actuation device 100 can be used to vary the average stroke length in the Atkinson cycle.

The construction in FIG. 13b provides the same features as these in 13a except that the locations of the actuating device 100 and sliding block 99 are interchanged. The control shaft 46 is connected by a control rod 62 to sliding block 64. The control shaft is pin-connected to sliding block 99 which can move longitudinally in fixed slideway 66. Actuating device 100 controls the distance between sliding block 99 and fixed point 101. Control shaft 46 rotates continuously to provide an improved thermodynamic cycle (i.e. Atkinson cycle) and cycle timing. Actuating device 100 varies the average position of sliding block 64, thereby varying the average stroke length.

In construction 13a and 13b, actuation device 100, which is shown as a hydraulic actuator, may be replaced by any device or mechanism which is capable of varying the distance between two points. Any suitable means may be connected to the device for controlled actuation thereof. The device may be microprocessor controlled so as to choose the appropriate average piston length for the given engine load conditions.

The constructions shown in FIG. 13 can be proportioned so that constant compression ratio is maintained while varying the average piston stroke length, as discussed in connection with FIG. 9. Alternatively, sliding block 64 can be designed to slide along an axis angled so that the compression ratio varies in a desired manner with average piston stroke length.

Figure 14:
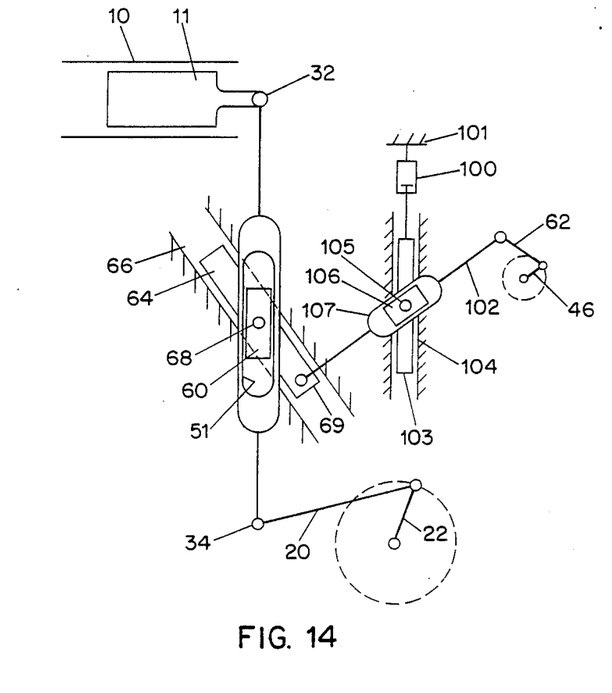
FIG. 14 is a schematic view of another swing beam engine having Rapson slide elements and two degree of freedom controls.

FIG. 14 illustrates a variation on the constructions shown in FIG. 13. As in the case of FIG. 13, a piston 11 slides in a cylinder 10 and is pin connected to a swing beam 50a. The opposite end 34 of the swing beam 50a is connected through connecting rod 20 to the main crankshaft 22. Moreover the swing beam 50a includes a slide portion 51 which is slidably received in a guide groove of swing block 60. As in the case of FIG. 13, the swinging block 60 is pivotably connected about a pivot 68 to a sliding block 64, which in turn is longitudinally displaceable in fixed slideway 66. A continuously rotating control shaft 46 provides an oscillating motion to sliding block 64 about an average position. The control shaft 46 is driven typically at an odd multiple of half crankshaft speed. Appropriate phasing of the control shaft and crankshaft, such that the power stroke is made longer than the compression stroke, will produce an Atkinson cycle.

Actuation device 100, shown as a hydraulic actuator, controls the average position of sliding block 64. Therefore, actuator device 100 can be used to vary the average stroke length. The angle of slideway 66 can be chosen so that the compression ratio remains constant while varying the average piston stroke length. Alternatively, the angle of slideway 66 can be selected so that the compression ratio changes in a controlled manner.

The construction in FIG. 14 is therefore capable of providing the combined features of improved thermodynamic cycle and variable average stroke length that were available with the constructions in FIG. 13. In contrast, however, the construction in FIG. 14 has the control shaft coupled to sliding block 64 through a Rapson slide instead of through a slider crank mechanism. Auxiliary beam 102 is pivotably connected at one end to the pivot 69 of the sliding block 64, and at its opposite end, through a connecting rod 62, to control shaft 46. Moreover, auxiliary beam 102 includes a slide portion 107 which is slidingly received in a guide groove of swinging block 106. The swinging block 106 is pivotally connected, about a pivot 105, to a sliding block 103 which in turn is longitudinally displaceable in fixed slideway 104. An actuation device 100 controls the distance between sliding block 103 and fixed point 101.

Continuously rotating control shaft 46 causes auxiliary beam 102 to rotated about its pivot 105, thus causing sliding block 64 to oscillate about an average position. With appropriate phasing between control shaft 46 and crankshaft 22, the power stroke is made longer than the compression stroke. Actuating device 100 varies the position of sliding block 103 and consequently changes the average position of sliding block 64. Thus, actuating device 100 varies the average stroke length of the piston. As the average stroke length varies, the compression ratio is controlled in a manner determined by the angularity of slideway 66. The angle chosen for slideway 104 also affects the piston motion. If slideway 104 is perpendicular to beam 102 at its mean angular position, the motion of sliding block 103 only varies the average position of sliding block 64. However, if slideway 104 is at a different angle, then the motion of sliding block 103 moves pivot 105 along the axis of beam 102. Beam 102 rotates through a different angle due to this movement of its pivot point. Consequently, the oscillatory motion of sliding block 64 is changed as well. The ratio of the length of the power stroke to the compression stroke is varied when actuator device 100 moves sliding block 103 along an appropriately angled slideway 104. For the constructions shown in FIG. 13, the ratio between the power stroke and compression stroke remains essentially unchanged when the average stroke length is changed by actuating device 100.

The construction shown in FIG. 14 can be proportioned so that the motion of actuator device 100, in response to a given engine load, has the following results:

(a) The average piston stroke is varied;
(b) The compression ratio is held constant or varied in a preferred manner; or
(c) The length of the power stroke is held constant or varied in a preferred ratio with compression stroke.

If desired, a phase changer (between the crankshaft or camshaft and the control shaft) may be employed in any of the embodiments. A phase changer, as discussed above, will modify the movement of the piston stroke as a function of time, and thereby change timing and other operating characteristics.

FIG. 9 illustrates that, by appropriate kinematic design, embodiments of the invention can provide variable stroke operation in which changes in top dead center timing are negligible. In other embodiments, however, an adjustment in phase may be needed in order to control valve timing, the timing of an Atkinson cycle, and the timing in variable stroke or variable compression ratio operating modes. The control levers for variable stroke operation, which have been described in connection with FIGS. 8–14, can also be proportioned for variable compression ratio operation if desired.

If a phase changer is needed, well known bevel gear or spur gear type of arrangements, as well as others, including known variable valve timing mechanisms, can readily be used in the embodiments of the invention.

FIGS. 12a–c illustrate an embodiment of a four cylinder variable-stroke engine, in which the embodiment of FIGS. 8a–8e is used for each of the four cylinders. For clarity, FIG. 12c shows only two of the four pistons A, B. The phasing of the crank throws of crankshaft 22 is preferably 0°-180°-180°-0°, as in a conventional, in-line four cylinder engines. Corresponding positions of the four pistons are shown in FIG. 12a.

Each piston A, B is connected by a swing beam 50a and rod 20 to the crankshaft 22. As in the case of FIG. 8a, each swing beam 50a engages a swing block 60a and 60b, respectively so as to slide and pivot relative to a pivot pin 68', and an auxiliary slider 64' is displaceable along a fixed slideway 66 to adjust the position of the pivot pin 68'.

Pin 68' extends perpendicular to the slideway through swinging block 60a–b associated with each swing beam 50a. Sliders 64' (and associated slideways 66) are provided to support the pin 68' at axially spaced locations.

The position of the sliders 64', and thereby the pivot pin 68' for all of the swing beams 50, is controlled by a unitary control shaft 46', which acts as a control lever, coupled to the pivot pin 68' through links 62, one link 62 being associated with each slider 64'. The control shaft may, if desired, be integral with the camshaft or may be separate. Alternatively, the control shaft can be designed and dimensioned to function in an Atkinson cycle or a variable compression ratio mode of operation.

The arrangement in FIG. 12c is for schematic clarity and persons skilled in the art will readily recognize that the actual mechanical structures will differ, for example as described in connection with FIGS. 8d–8e.

The ability to use a unitary control lever 46' makes the present invention especially advantageous for use in an in-line engine. The timing during the power stroke can be optimized by appropriate choice of linkage proportions, as described in connection with FIG. 9.

The dynamic balance of the engine is analogous to that of two opposed piston engines. However, the balance will be better. In an opposed piston engine involving connecting rods phased 180° on a common crankshaft, the connecting rods produce an inertial unbalance, because their rotational inertias act in the same sense. In the four cylinder engine of FIG. 12, however, the unbalance associated with the connecting rods for the A-A pistons is opposite to that associated with the connecting rods of the B-B pistons.

In multicylinder engine configurations based on the embodiments which we have described, it is possible to consider various modes of operation, including the following:
1. fixed stroke-Otto cycle;
2. fixed stroke-Atkinson cycle;
3. variable stroke-Otto cycle;
4. variable stroke-Atkinson cycle; and
5. variable compression ratio-Atkinson or Otto cycles For any given engine, it may be desirable to utilize one, or more than one, of these modes as options. Mode 1 corresponds to the conventional internal-combustion engine, while Mode 5 may involve adjustments, such as that described in connection with FIG. 10 and FIG. 14.

In the case of Mode 2 operation, the control shaft can be unitary, but the throws of crank and control shafts need to be phased appropriately. For example, if the arrangement of FIG. 5a is used to construct an in-line, four-cylinder engine with 0°–180°–180°–0° crank throws and with the control shaft operating at one half crank speed, the phasing of the throws of the control shaft would be 0°–270°–90°–180° to achieve the FIG. 5c timing in each cylinder.

In the case of Mode 3 operation, the control shaft functions as a control lever and the lever position is the same for all cylinders, i.e. the control shaft can be unitary and function as an eccentric, as shown in FIG. 12.

In the case of Mode 4 operation, it is possible to use a unitary control shaft configured as in Mode 2 operation, but the position of the control shaft may be a function of stroke, i.e. the axis of the control shaft may be displaceable along axis $M_1$–$M_2$–$M_3$ of FIG. 9 by an amount depending on stroke. A phase changer may be needed in this mode of operation and any of the well known phase changers can be used for this purpose.

While the piston/cylinder configuration of the embodiment shown in FIG. 12 is that of the in-line, four cylinder, slider crank engine, it will be clear to those skilled in the art that any in-line or other piston-cylinder configuration can be obtained with swing beam designs of the type described in FIG. 12 by replacing the slider crank piston actuation of the conventional in-line engine or other conventional engines by the swinging beam actuation described in this invention.

The engine configurations which have been described can function with either internally or externally operating pistons. The term internal refers to opposed piston arrangements in which the combustion chamber is located between the pistons. External arrangements are those in which the combustion chamber is adjacent to the ends of the piston which are furthest from the plane of symmetry of the engine.

The inventions of many of the present embodiments of this invention are derived from multiple degree of freedom linkages by using one freedom for the crankshaft motion and the other freedom for the motion of the control means. These mechanisms retain favorable proportions when designed for Atkinson cycle operation, variable stroke operation, and variable compression ratio operation, without a significant diminution of their force transmission and dynamic characteristics. All of the embodiments may be used in two stroke as well as four stroke engines, and in spark ignited as well as diesel type engine constructions.

The foregoing represent preferred embodiments of the invention. Further variations and modifications of the constructions shown and described herein will be apparent to persons skilled in the art, without departing from the inventive concepts disclosed herein. All such modifications and variations are intended to be within the scope of the invention, as set forth in the following claims.

We claim:

1. In an internal-combustion engine having a cylinder, a piston displaceable in the cylinder, a crankshaft, and a swing beam:
    first coupling means between one end of the swing beam and the piston;
    second coupling means between the crankshaft and swing beam;
    pivot establishing means engaging the swing beam for causing the swing beam to rotate in an oscillating manner about a pivot point; and
    control means for controlling the position of the pivot establishing means, comprising:
    first slider means positioned in a slideway and engaging said pivot establishing means for permitting movement along a first predetermined path;
    first slider positioning means for imparting oscillating movement to said first slider means about an average position on said slideway; and
    second slider positioning means acting on said first slider positioning means for selectively varying said average position.

2. An internal-combustion engine as defined in claim 1, wherein said first slider positioning means comprises a control shaft and means for moving said control shaft in a periodic motion.

3. An internal-combustion engine as defined in claim 2, wherein said second slider positioning means comprises actuator means for coupling said control shaft and said first slider means and for selectively varying the distance therebetween.

4. An internal combustion engine as defined in claim 2, wherein said control shaft is coupled to said first slider means, wherein the means for moving said control shaft rotates said shaft about a rotational axis, and wherein said second slider positioning means comprises actuator means for selectively displacing said rotational axis.

5. An internal-combustion engine as defined in claim 2, wherein said first slider positioning means further comprises an auxiliary control lever coupled to said first slider means for moving said first slider means along said first predetermined path; third coupling means between said control shaft and said auxiliary control lever; and auxiliary pivot establishing means engaging the auxiliary control lever for causing said auxiliary control lever to pivot about the said auxiliary pivot; and wherein said second slider positioning means comprises auxiliary control means for controlling the position of said auxiliary pivot establishing means.

6. An internal-combustion engine as defined in claim 5, wherein said auxiliary control means includes second slider means engaging said auxiliary pivot establishing means for permitting movement along a second predetermined path.

7. An internal-combustion engine as defined in claim 6, wherein said pivot establishing means and said auxiliary pivot establishing means each comprise a swinging block means for permitting said swing beam and auxiliary control lever, respectively, to slide and rotate relative to its respective pivot.

8. An internal-combustion engine as defined in claims 2, 3, 4, or 5, wherein the means for moving said control shaft comprises coupling means between said crankshaft and said control shaft for rotating said control shaft at one-half crankshaft speed.

9. An internal-combustion engine as defined in claim 2, 3, 4, or 5, wherein said first slider means includes means for permitting movement of said pivot establishing means along a substantially linear path oriented such that movement of the swinging block along such path maintains a substantially constant compression ratio.

10. An internal-combustion engine as defined in claim 7, wherein said auxiliary control means includes means for moving said auxiliary pivot establishing means along a substantially linear path for varying the power stroke.

11. An internal-combustion engine as defined in claims 2, 3, 4, or 5, wherein said first slider means is oriented to produce a predetermined change in compression ratio responsive to movement along said path.

12. An internal-combustion engine as defined in claims 2, 3, 4, or 5, wherein the first slider means is positioned such that movement along said path varies the relative lengths of the compression and power strokes.

* * * * *